United States Patent
Senarath et al.

(10) Patent No.: US 9,369,973 B2
(45) Date of Patent: *Jun. 14, 2016

(54) SYSTEMS AND METHODS FOR DOWNLINK POWER CONTROL AND SCHEDULING IN A WIRELESS NETWORK

(71) Applicant: Futurewei Technologies, Inc., Plano, TX (US)

(72) Inventors: Nimal Gamini Senarath, Ottawa (CA); Hang Zhang, Nepean (CA); Ho Ting Cheng, Stittsville (CA); Vahid Tarokh, Cambridge, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/743,740

(22) Filed: Jun. 18, 2015

(65) Prior Publication Data

US 2015/0351055 A1    Dec. 3, 2015

Related U.S. Application Data

(63) Continuation of application No. 13/613,758, filed on Sep. 13, 2012, now Pat. No. 9,072,065.

(51) Int. Cl.
*H04B 7/00* (2006.01)
*H04W 52/38* (2009.01)
*H04W 72/12* (2009.01)
*H04W 52/22* (2009.01)

(52) U.S. Cl.
CPC .......... *H04W 52/386* (2013.01); *H04W 52/226* (2013.01); *H04W 72/12* (2013.01)

(58) Field of Classification Search
USPC .............. 455/522, 69–70, 450–455; 370/310, 370/315–320
See application file for complete search history.

(56) References Cited

U.S. PATENT DOCUMENTS 8,750,257 B2 * 6/2014 Chung .................... H04J 13/00
                                                      370/335
8,755,791 B2 * 6/2014 Bontu .................. H04L 1/0026
                                                      370/252

(Continued)

FOREIGN PATENT DOCUMENTS

CN    101940038    1/2011
CN    102421179    4/2012

OTHER PUBLICATIONS

International Search Report and Written Opinion received in International Application No. PCT/CN2013/083274 mailed Dec. 19, 2013, 9 pages.

*Primary Examiner* — Fayyaz Alam
(74) *Attorney, Agent, or Firm* — Slater Matsil, LLP (57) ABSTRACT

Methods and systems for providing joint power control (PC) and scheduling in a wireless network are provided. In one example, a method includes generating a near-optimal power pattern for PC and scheduling in accordance with long term channel statistics. The near-optimal PC solution may be generated by first generating a set of possible power patterns in accordance with likely scheduling scenarios, then statistically narrowing the set of possible power patterns to identify the most commonly used power patterns, and finally selecting one of the most commonly used power patterns as the near-optimal power pattern. In another example, a table of optimal PC solutions are provided for performing distributed PC and scheduling in an adaptive and/or dynamic manner.

22 Claims, 11 Drawing Sheets

(56) References Cited

U.S. PATENT DOCUMENTS

| | | | | |
|---|---|---|---|---|
| 8,767,610 B2 * | 7/2014 | Kim | ............... | H04B 7/0413 370/315 |
| 2010/0041408 A1 * | 2/2010 | Caire | ............... | H04L 5/0007 455/446 |
| 2012/0083201 A1 * | 4/2012 | Truong | ............... | H04W 52/46 455/9 |
| 2012/0188988 A1 * | 7/2012 | Chung | ............... | H04J 13/00 370/335 |
| 2013/0095872 A1 | 4/2013 | Sediq et al. | | |
| 2013/0130707 A1 * | 5/2013 | Tarokh | ............... | H04W 72/121 455/452.1 |
| 2013/0136024 A1 | 5/2013 | Che et al. | | |

\* cited by examiner

FIG. 17 ated power control scheme, and a static FFR power control scheme, as discussed above.

SYSTEMS AND METHODS FOR DOWNLINK POWER CONTROL AND SCHEDULING IN A WIRELESS NETWORK

This application is a continuation of U.S. Non-Provisional application Ser. No. 13/613,758 filed on Sep. 13, 2012, entitled "Systems and Methods for Downlink Power Control and Scheduling in a Wireless Network," which is hereby incorporated by reference herein as if reproduced in its entirety.

TECHNICAL FIELD

The present invention relates generally to wireless communications, and, in particular embodiments, to optimizing downlink power control and scheduling in wireless communication systems.

BACKGROUND

Downlink power control (PC) is an important consideration in modern day cellular communication systems that rely on code division multiple access (CDMA) schemes, Orthogonal Frequency-Division Multiple Access (OFDMA) schemes, single carrier frequency division multiple access (SC-FDMA) schemes, and others, to manage downlink communications. Specifically (long term evolution (LTE) wireless networks), downlink PC regulates the power levels of frequency bands and the assignment of time-frequency resources in the Physical Downlink Shared Channel (PDSCH). Effective downlink PC schemes will provide adequate coverage and throughput in a wireless network.

SUMMARY OF THE INVENTION

Technical advantages are generally achieved, by preferred embodiments of the present invention which describe system and methods for optimizing downlink power control.

In accordance with an embodiment, a method for providing joint power control (PC) and scheduling in a wireless network is provided. In this example, the method includes receiving long term channel statistics collected during a first instance of a periodic time interval, and generating a near-optimal power pattern based on the long term channel statistics. In an embodiment, the near-optimal power pattern may be obtained by first generating a set of possible power patterns in accordance with likely scheduling scenarios, then statistically narrowing the set of possible power patterns to identify the most commonly used power patterns, and finally selecting one of the most commonly used power patterns as the near-optimal power pattern. In accordance with another embodiment, an apparatus for performing this method is provided.

In accordance with yet another embodiment, a method for facilitating dynamic adaptive fractional frequency reuse (FFR) in a wireless network. In this example, the method includes identifying a plurality of common scheduling scenarios observed during an extended period in a wireless network, and generating a table of optimal power patterns for the common scheduling scenarios. The optimal power patterns may be determined in accordance with the long term channel statistics, and the table of optimal power patterns may be provided to distributed base stations for implementation in the wireless network. In accordance with yet other embodiments, appropriate apparatuses (e.g., a central controller, eNBs, etc.) for implementing this method are provided.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
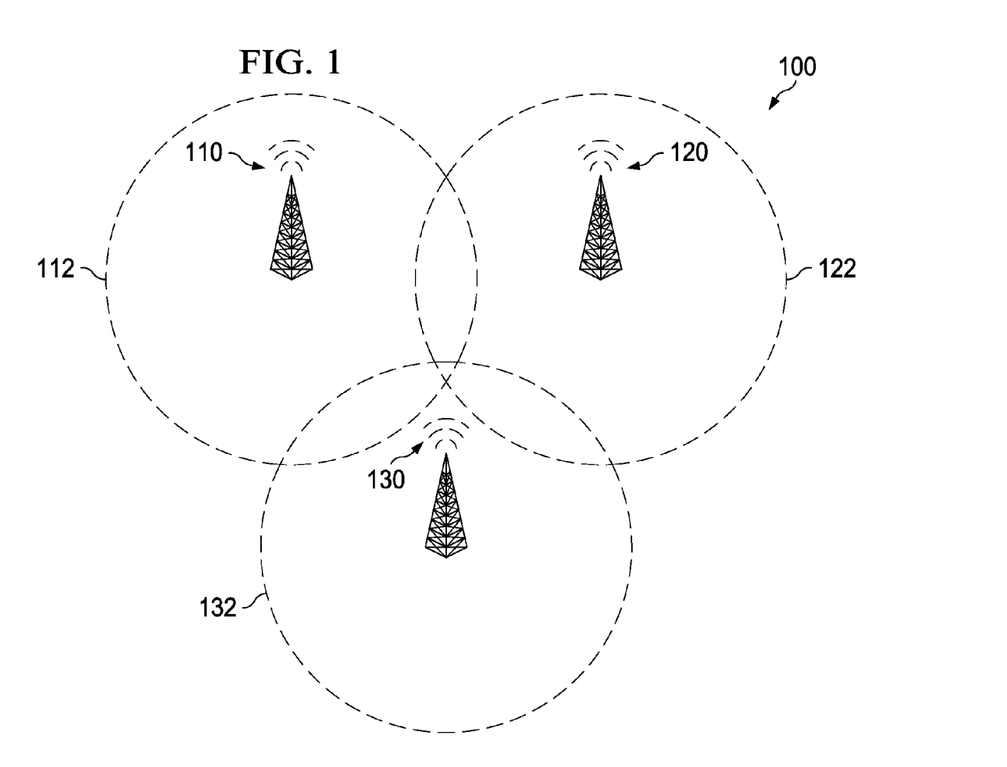
FIG. 1 illustrates a wireless network architecture for implementing a distributed power control scheme.

Downlink PC can be managed in a distributed manner such that downlink PC solutions are computed locally by base stations (eNBs). FIG. 1 illustrates a network 100 for performing localized/distributed PC where a plurality of neighboring eNBs 110-130 compute their PC solutions independently. As shown, the eNB 110 has a coverage area 112, the eNB 120 has a coverage area 122, and the eNB 130 has a coverage area 132

Figure 2:
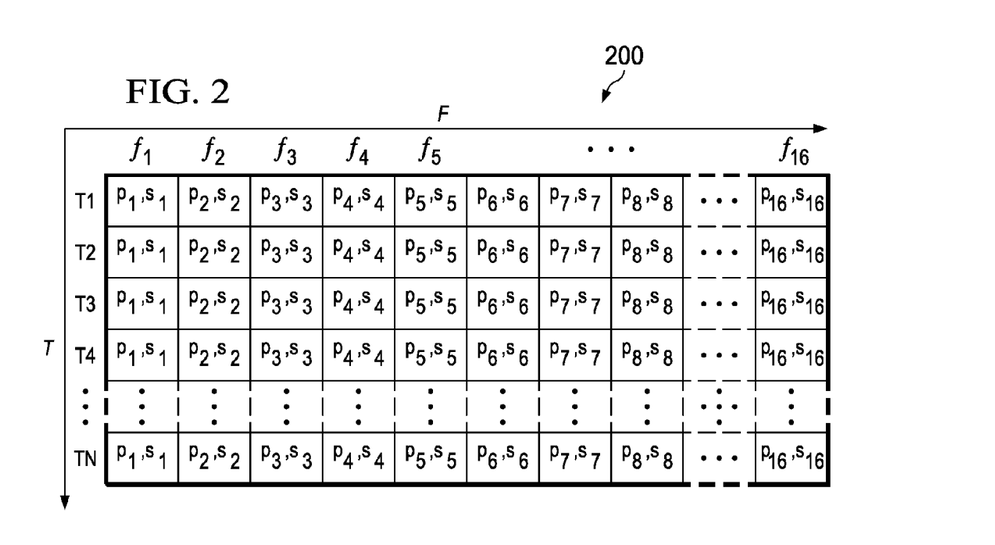
FIG. 2 illustrates a diagram of a local PC solution.

(user equipments (UEs) have been omitted for the sake of clarity and concision). FIG. 2 illustrates a PC solution 200 computed locally by the eNB 110 for a block of available time-frequency resources, which are represented by resource blocks (RBs) (denoted by the squares) extending over a time domain (T) (including timeslots T1, T2, ..., TN) and a frequency spectrum (F) (including frequency bands $f_1, f_2, \ldots f_{16}$). Notably, the frequency spectrum (F) is exemplary and may be modified to include more or fewer than sixteen frequency bands based on the needs of the system. The PC solution 200 includes a plurality of power settings ($p_1$-$p_{16}$) and a plurality of scheduling assignment ($s_1$-$s_{16}$) for the RBs of a given timeslot (T1, T2, ... TN). Each power setting ($p_i$) may specify a power level to be used for a downlink transmission in the corresponding RB, while each scheduling assignment ($s_i$) may specify a member UE that has been assigned to receive the downlink transmission in the corresponding RB. In some embodiments, one or more of the scheduling assignments may specify multiple UEs, for instance, when an RB is designated for multi-user multiple-input-multiple-output (MU-MIMO) applications.

Although scalable, high levels of inter-cell-interference often result between neighboring cells when downlink PC is managed without centralized management or joint cooperation amongst neighboring eNBs. Specifically, eNBs typically transmit downlink signals at higher power levels for frequencies assigned to cell-edge users (CEUs) than for frequencies assigned to cell center users (CCUs) to compensate for greater signal attenuation attributable to the longer propagation distance. As such, high levels of inter-cell-interference (ICI) generally result when neighboring cells use the same frequency band to communicate with their respective CEUs, as may often occur when PC is handled independently by each eNB.

Figure 3:
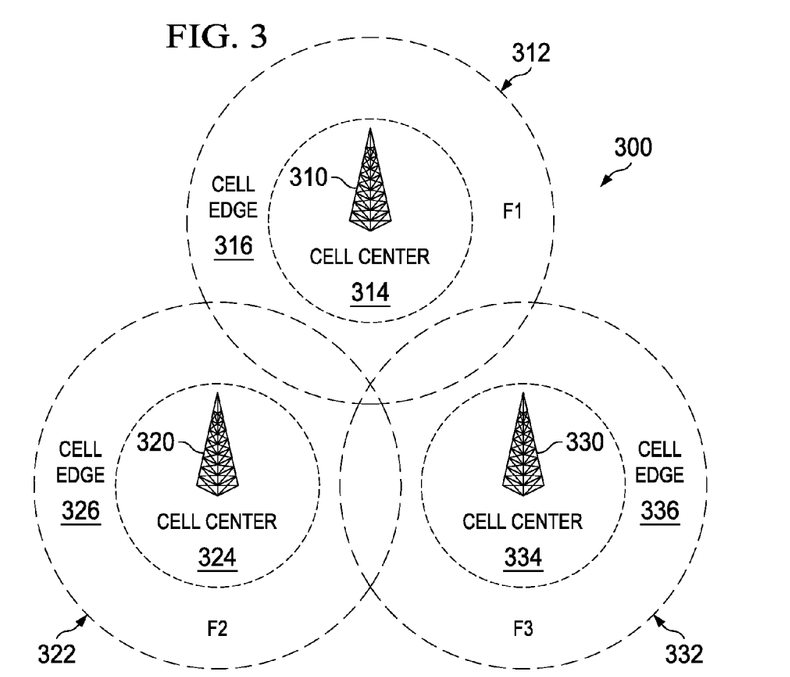
FIG. 3 illustrates a wireless network architecture for implementing a static fractional frequency re-use (FFR) power control scheme.

One alternative to localized PC is to statically assign different frequencies for use at the cell-edge of neighboring cells, which may generally be referred to as fractional frequency re-use (FFR). FIG. 3 illustrates a diagram of a network 300 for implementing a static FFR scheme. As shown, the network 300 comprises a plurality of neighboring eNBs 310-320 (user equipments (UEs) are omitted for the sake of clarity and concision). The eNB 310 has a coverage area 312, which is divided into a center cell area 314 and a cell edge area 316. Similarly, the eNB 320 has a coverage area 322 (divided into a center cell area 324 and a cell edge area 326), and the eNB 330 has a coverage area 332 (divided into a center cell area 334 and a cell edge area 336). As shown, each of the eNBs 310-330 uses a different frequency (e.g., F1, F2, and F3) for their respective cell edge areas, which helps to reduce ICI in the network 300. Notably, in some embodiments (e.g., soft FFR schemes), when one of the eNBs 310-330 uses a particular frequency for cell-edge transmissions, neighboring ones of the eNBs 310-330 may constrain their use of that frequency to low power transmissions. This may effectively mitigate the inter-cell-interference in the network 300, while still allowing the neighboring eNBs 310-330 to have at least limited use of that frequency.

Although useful for reducing ICI, static FFR schemes (such as that illustrated in FIG. 3) underutilize bandwidth resources because frequency allocations do not adapt to different traffic patterns and/or non-uniform user distributions amongst the various cells of the network. For instance, it may be advantageous for the eNB 310 to utilize both F1 and F2 for cell-edge transmissions (e.g., while the eNB 320 and 330 use different subbands of the F3 spectrum) if a disproportionately high number of UEs are positioned within the outer cell area 316 (in comparison to the outer-cell areas 326 and 336). As such, techniques for dynamically allocating frequency bands (or sub-bands) in networks using FFR power schemes are desired.

Figure 4:
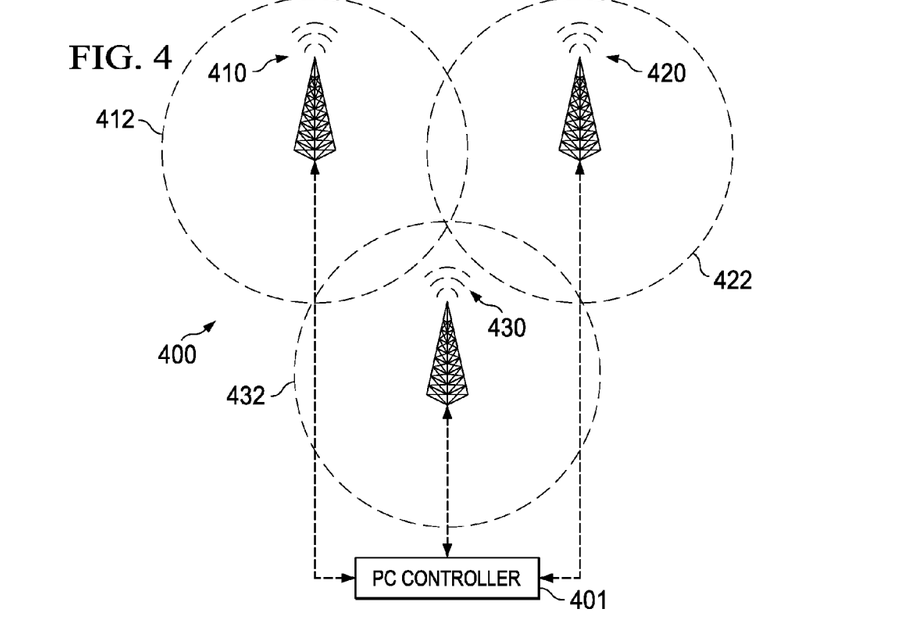
FIG. 4 illustrates a diagram of a wireless network architecture for implementing centralized or hybrid power control scheme.

Another alternative is centralized power control, where a global PC solution is dynamically computed by a centralized PC controller. FIG. 4 illustrates a wireless network 400 comprising a PC controller 401, a PC and a plurality of eNBs 410, 420, and 430 corresponding to a plurality of coverage areas 412, 422, and 432 (respectively). The PC controller 401 may be any device capable of computing PC solutions for the wireless network 400 based on data provided by the eNBs 410-430 and/or other configuration data. The eNBs 410-430 may be configured similar to the eNBs 110-130 and/or the UEs 410-430, and may serve a plurality of UEs (which are not depicted in FIG. 4 for purposes of clarity and concision).

Figure 5:
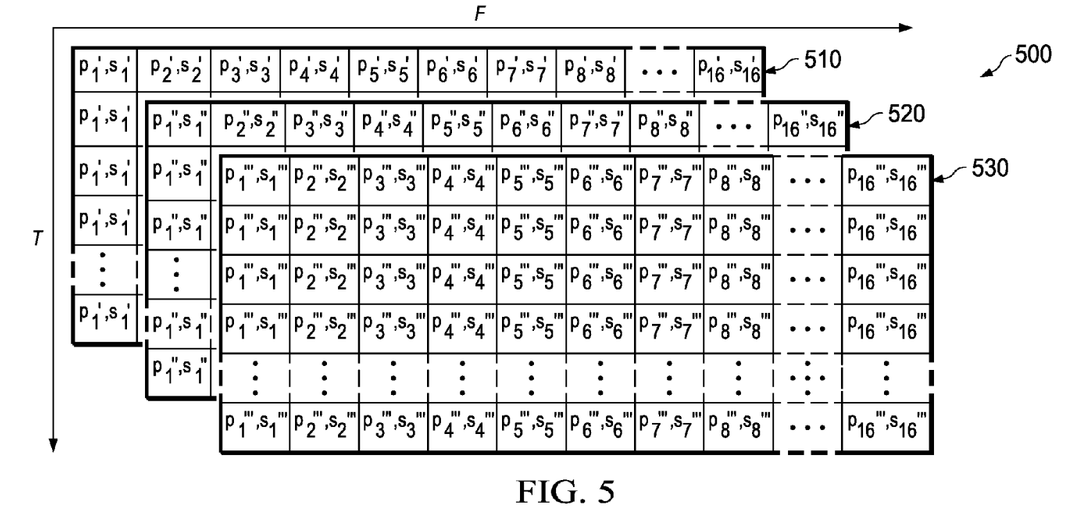
FIG. 5 illustrates a diagram of a global PC solution.

The centralized controller 401 may dynamically compute PC solutions for each of the eNBs 410-430 based on the data (e.g., channel statistics) provided by the eNBs 410-430. When using an exhaustive search approach, the PC controller 401 may consider all possible combinations of PC solutions, and therefore may generate a set of PC solutions that optimizes throughput/coverage in the network 400. However (for reasons discussed below), computing a global PC solution in a truly dynamic fashion using an exhaustive search approach may be difficult to execute from a practical standpoint due to the finite computation resources in many wireless networks. FIG. 5 illustrates a global PC solution 500 for the eNBs 410-430. As shown, the global power solution 500 comprises a PC solution 510 having a set of power settings and scheduling assignments [($p_1',s_1'$); ... ($p_{16}',s_{16}'$) ] for the eNB 410, a PC solution 520 having power settings and scheduling assignments [($p_1'',s_1''$); ... ($p_{16}'',s_{16}''$)] for the eNB 420, and a PC solution 530 having power settings and scheduling assignments [($p_1''',s_1'''$); ... ($p_{16}''',s_{16}'''$)] for the eNB 430. Each of the PC solutions 510-530 may be similar to the PC solution 200, but may be computed collectively such that power settings and scheduling assignments in the PC solutions 520-530 are considered when developing the PC solution 510 (and vice-versa).

Although dynamic computation of a global PC solution may (theoretically) optimize throughput/coverage, practical limitations may restrict its implementation in many networks. Specifically, the exhaustive search approach required to obtain optimal throughput/coverage may place a heavy computational load on the PC controller 401. This may be especially problematic in large networks, where the computational load may become so onerous that dynamic globalized PC using an exhaustive search approach becomes infeasible.

One technique for reducing the computation load of the PC controller is to use a non-exhaustive algorithm (e.g., an algorithm that considers fewer than all possible combinations). However, non-exhaustive algorithms that produce near-optimal results often-times cannot be performed quick enough to achieve dynamic implementation, while non-exhaustive algorithms capable of achieving dynamic implementation often produce sub-optimal results.

Figure 6A:
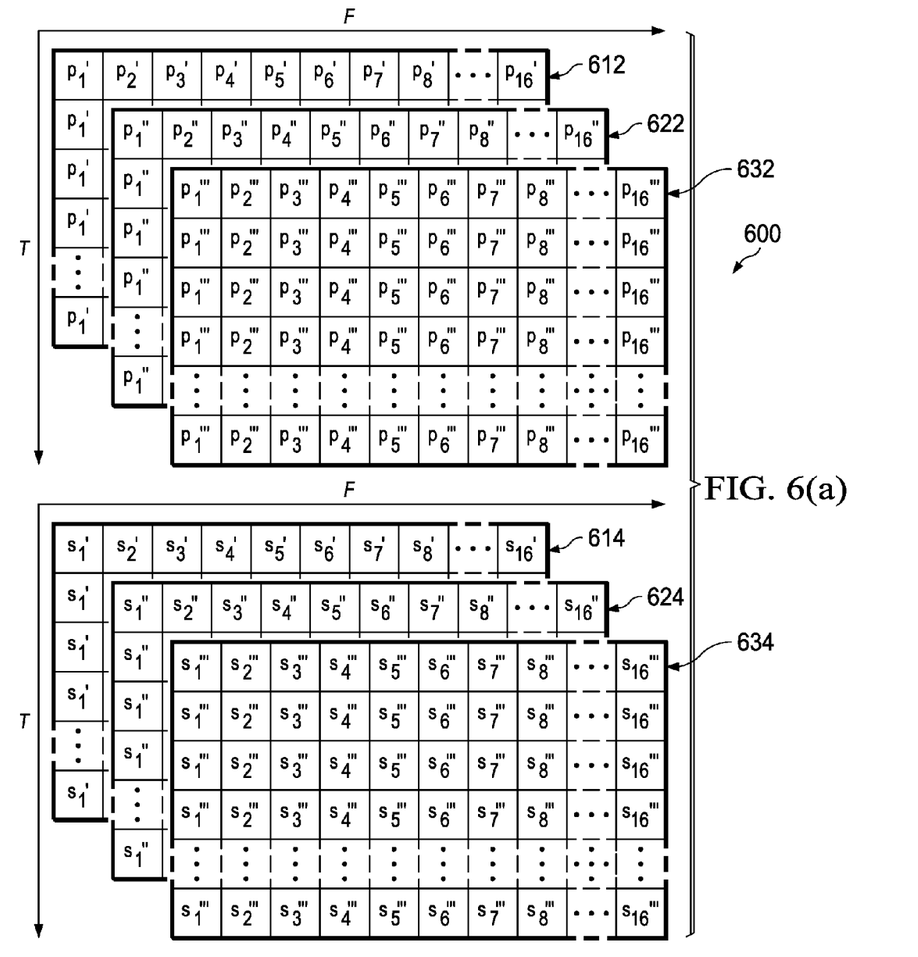
FIG. 6(a) illustrates a diagram of a hybrid PC including joint power control (JPC) with localized scheduling.

Another technique for reducing the computation load of the PC controller is to delegate scheduling (e.g., including modulation and coding selection) to the eNBs 410-430. Specifically, computation of the PC solution 500 can be bi-furcated into (essentially) two tasks, namely: (1) computation of a power pattern (e.g., a set of power settings for the various time-frequency resources); and (2) scheduling. In embodiments, scheduling may include assigning various time-frequency resources to the UEs as well as selecting modulation and coding schemes (MCSs) for transmission). FIG. 6(a) illustrates a bifurcated PC solution 600 comprising a set of power settings 612, 622, 632 and a matching set of scheduling assignments 614, 624, and 634, which correspond to the PC solutions 510-530. Hence, when a hybrid approach is used, the power controller 401 is responsible for the power settings 612, 622, 632 (i.e., joint power control (JPC)), while the eNBs 410-430 are responsible for the scheduling assignments 614, 624, and 634 (i.e., localized scheduling). The localized scheduling may include the modulation and coding (MCS) levels for those transmissions. Notably, the scheduling assignments 614, 624, and 634 are computed based on the power settings 612, 622, 632, and hence localized scheduling may generally be performed after global computation of the power control settings (i.e., after JPC).

Figure 6B:
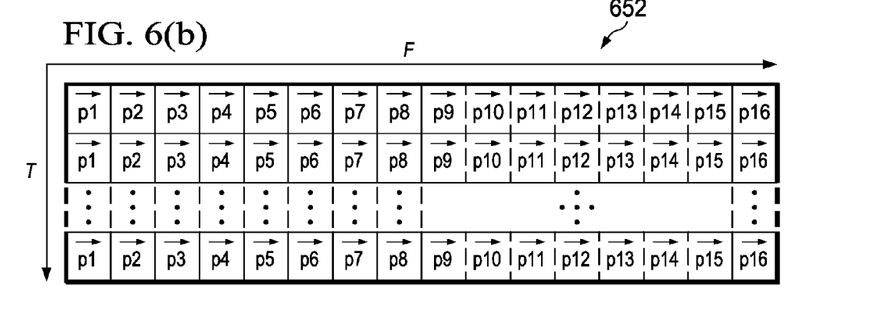
FIG. 6(b) illustrates a diagram of a JPC pattern including power setting vectors.

For purposes of clarity, corresponding power settings (e.g., p1', p1", p1''') in the set of power patterns 612, 622, 632 can be represented as vectors, as depicted by the power pattern 652 in FIG. 6(b). As shown, each RB of the power pattern 652 has a power setting vector $\vec{p_l}$, which corresponds to the set of power settings ($p_l'$, $p_l''$, $p_l'''$) from the power patterns 612, 622, 632. Hence, the power pattern 652 is short-form notation of the power patterns 612, 622, 632, from individual eNBs and likewise may be dynamically computed (e.g., according to algorithm) based on channel statistics reported from the eNBs 410-430.

Figure 7:
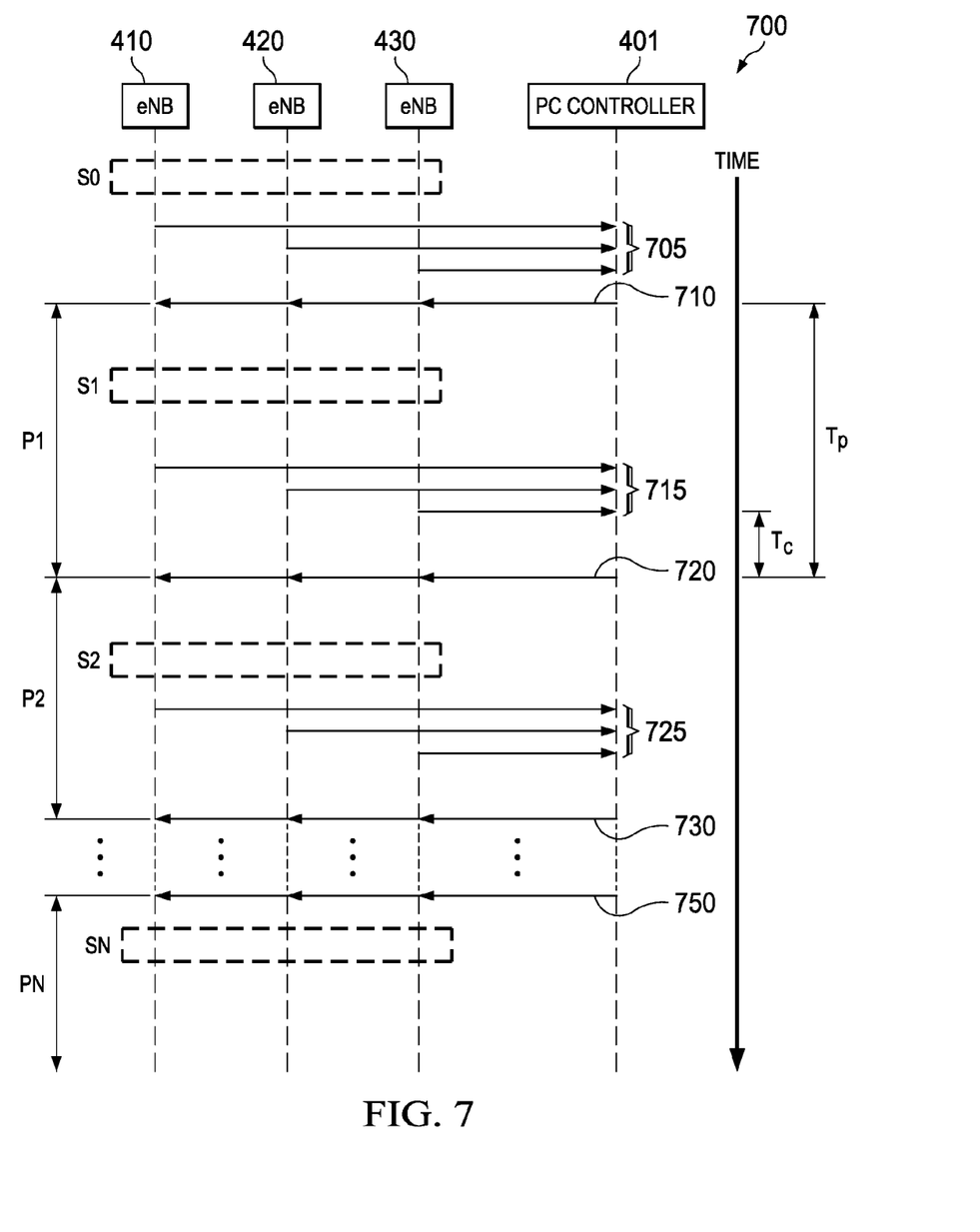
FIG. 7 illustrates a diagram of a communication protocol for performing hybrid power control including JPC with localized scheduling.

FIG. 7 illustrates a protocol diagram depicting a prior art communication sequence 700 between the eNBs 410-430 and the PC controller 401 for the purpose of computing a power pattern 652. The communication sequence 700 may begin with the eNBs 410-430 reporting short-term channel statistics 705 to the PC controller 401. The channel statistics 705 may specify the information gathered during the scheduling (S0), and hence may only reflect a snapshot of the traffic pattern and/or user distribution of the network 400. The PC controller 401 may compute a power pattern (P1) upon receiving the channel statistics 705, and thereafter return a set of corresponding power settings 710 to the eNBs 410-430. Upon receiving the power settings 710, the eNBs 410-430 may perform a new round of scheduling (S1). Subsequently, the eNBs 410-430 will collect and report a second set of channel statistics 715 to the PC controller 401, which will be used to compute a second power pattern (p2). Hence, a new power pattern (PN) is computed for each round of scheduling (SN).

As shown, the computation period ($T_c$) required to compute the new power pattern may contribute to the overall period ($T_p$) required to dynamically update the global PC solution in the network 400. As the period ($T_p$) lengthens, the network 400 becomes less nimble in adapting to changing traffic conditions and/or user distributions. For instance, if the period ($T_p$) is 1000 timeslots (e.g., T1, T2, . . . T1000), then the power pattern 652 may be updated relatively seldom, resulting in latencies and/or sub-standard performance. Hence the relative effectiveness of dynamic computation in the network 400 may be limited by the delay period ($T_p$) between updates, which may increase/lengthen as the network 400 grows larger and larger. Since more accurate non-exhaustive algorithms for computing the PC pattern typically require more processing resources and/or longer computation periods ($T_c$), the relative effectiveness of said algorithms may be limited due to their inherently longer latencies (i.e., longer $T_p$).

Aspects of this disclosure describe a static approach, a semi-static approach, and an adaptive approach for computing power patterns, each of which offer numerous advantages over the distributed/localized, static-FFR, and centralized/dynamic approaches discussed above. The static approach for computing power patterns may comprise finding those power patterns that provide the best average performance for typical traffic conditions in the network. In some embodiments, the static approach may optimize power and frequency bands to achieve the best overall system performance, thereby offering significant advantages over the static-FFR approach discussed above. The semi-static approach for computing power patterns may exploit the tendency of networks to observe repetitive and/or correlated scheduling scenarios (e.g., traffic patterns, user distributions, etc.) during like time periods. Such repetitive and/or correlated scheduling scenarios may be attributable to the tendency of users (as a whole) to behave in a predictable manner during like periods. For instance, scheduling scenarios (e.g., traffic patterns, etc.) in a network or group of neighboring coverage areas may be relatively similar at a certain time interval (e.g., 10 am-11 am) on each day of the week. Hence, channel statistics gathered during a first instance of a time interval (e.g., 1 pm-2 pm on Monday) may be correlative to channel statistics gathered during successive corresponding intervals (e.g., Tuesday-Friday).

Figure 8:
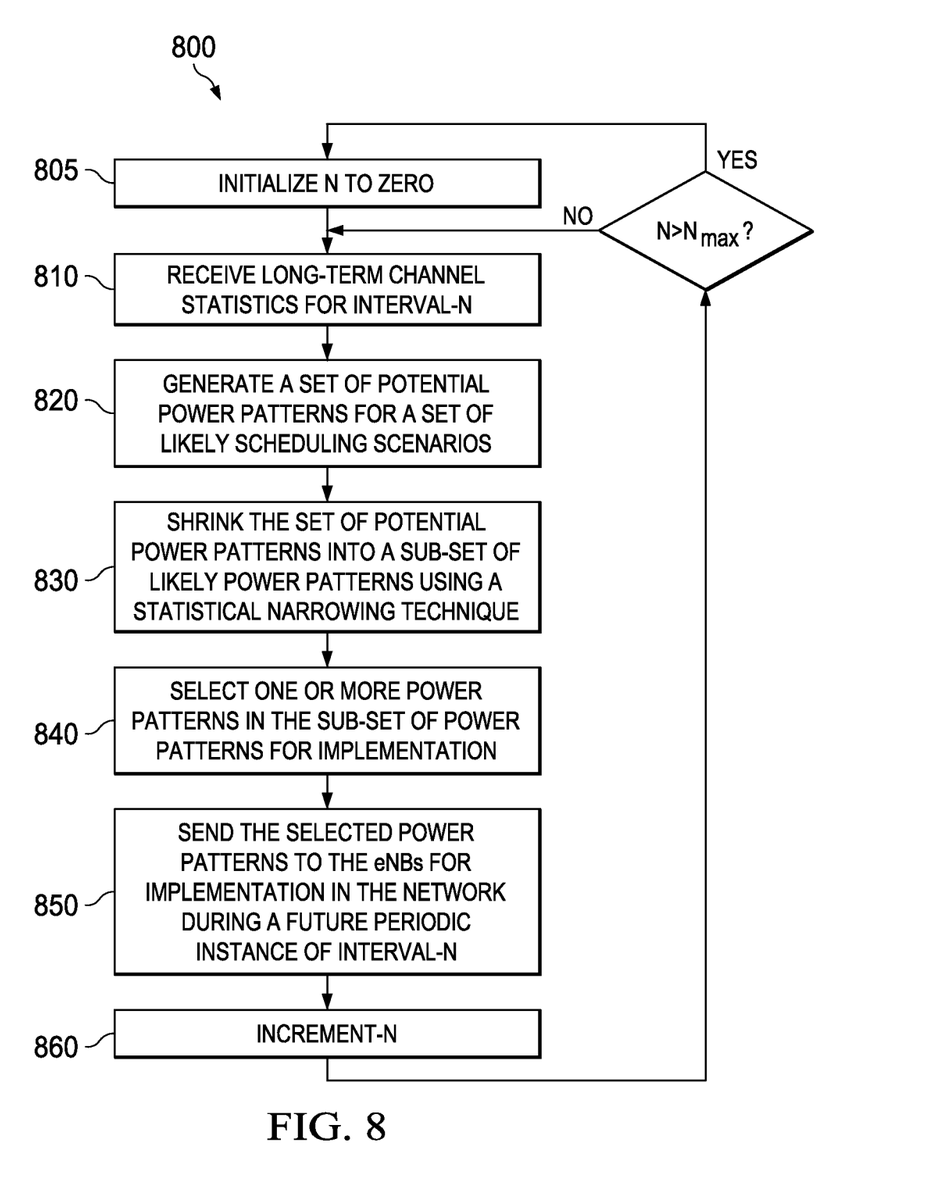
FIG. 8 illustrates an embodiment of a method for computing power patterns for use in semi-static JPC with localized scheduling.

FIG. 8 illustrates a method 800 for computing power patterns for use in semi-static JPC with local scheduling. The method 800 begins at block 805, where N is initialized to 0. Next, the method 800 proceeds to step 810, where the PC controller 401 receives long-term channel statics corresponding to an interval-N from the eNBs 410-430. The long-term channel statistics may be collected over an extended period of time by the eNBs 410-430 (e.g., one hour, etc.), and may correspond to a specific period of time uniquely associated with interval-N (e.g., between 12 pm and 1 am on weekdays). Next the method 800 may proceed to block 820, wherein the PC controller 401 may generate a set of potential power patterns for a set of likely scheduling scenarios. The likely scheduling scenarios may correspond to scheduling scenarios (e.g., traffic patterns, etc.) observed during the period (i.e., the interval-N) over which the long term channel statistics were collected.

Before carrying out this step, the controller may introduce fast/temporal fading components to the long-term channel statistics, and thereafter generate additional scheduling scenarios based off the modified long term-channel statistics. The fading components may be generated using information received from the distributed nodes, such as fading statistics of each channel (e.g., for each air channel between a user and each eNB). Various techniques exist for obtaining the fading components, such as Raleigh fading, Rician fading, etc. Adding temporal fading components may produce additional scheduling scenarios, and hence may cause more power patterns to be computed (e.g., a power patter for each additional scheduling scenario).

Next the method 800 may proceed to step 830, where the PC controller 401 may shrink the set of potential power patterns into a sub-set of power patterns using a statistical narrowing technique. In other words, the PC controller 401 may use statistical narrowing techniques to remove certain power patterns (e.g., uncommon power patterns) and/or merge multiple power patterns (e.g., redundant/correlated patterns) from the original set of potential power patterns, thereby generating a sub-set of common power patterns. These common power patterns may be those patterns that provide near-optimal settings for a high percentage of the likely (e.g., observed) scheduling scenarios (e.g., geographical traffic and user distributions, availability of other networks, interference from other networks, etc.). Various narrowing techniques (discussed in greater detail below) may be used to shrink the set of power-patterns into the sub-set of desirable power patterns. For instance, one statistical narrowing technique may merge repetitive and/or substantially correlated power patterns to identify high-probability power patterns as well as low-probability power patterns. The same or other techniques may cull (i.e., remove) improbable power patterns, thereby creating a sub-set of power patterns that are likely to be suitable for the vast number of scheduling scenarios (e.g., traffic patterns, user distributions, etc.) observed during the interval-N.

After shrinking the set of power patterns into the subset of common power patterns, the method 800 may proceed to step 840, where the PC controller may select one or more power patterns in the sub-set of power patterns to implement in the network during a future instance of the interval-N. In some embodiments, the power patterns may be selected randomly. In other embodiments, the power patterns may be selected based on an assigned probability (discussed below). The method 800 may then proceed to step 850, where the selected power patterns may be sent to the eNBs for implementation during the next periodic instance of Interval-N. Subsequently, the method 800 may proceed to step 860 where PC controller may increment N (e.g., by one). The method 800 may then repeat steps 810-860 until the power pattern(s) have been computed for all intervals in the cyclical period (e.g., until $N > N_{max}$), at which point N will be re-initialized to zero such that the method 800 may be repeated for the next cycle of intervals (as N is incremented from 0 to $N_{Max}$). For instance, $N_{max}$ may be equal to 23 during embodiments using 24 one-hour intervals for each day of the week.

Figure 9:
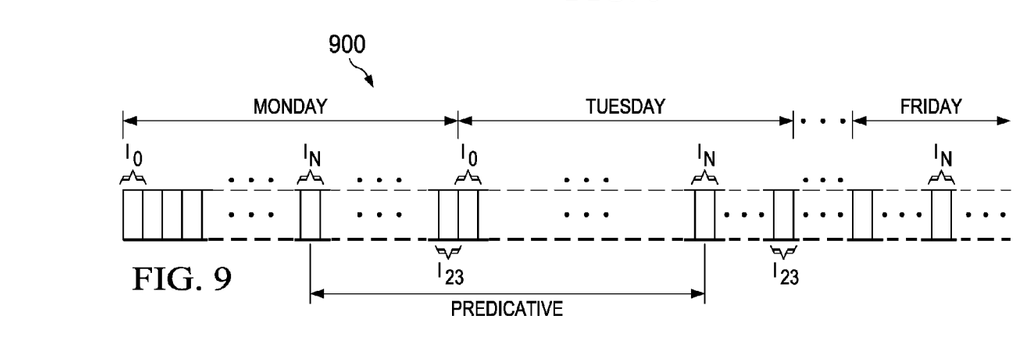
FIG. 9 illustrates a diagram of an embodiment of a recurring sequence of intervals for semi-static JPC.

FIG. 9 illustrates a cyclical sequence of intervals 900 comprising a plurality of intervals ($I_0$-$I_{23}$) that correspond to hours in a day (e.g., $I_0 \approx 12$ pm-1 am, etc.). As shown, the variables (e.g., channel statistics, traffic patterns, user distributions, etc.) of an earlier instance of a given interval ($I_N$) are predicative of later instances of that interval.

Figure 10:
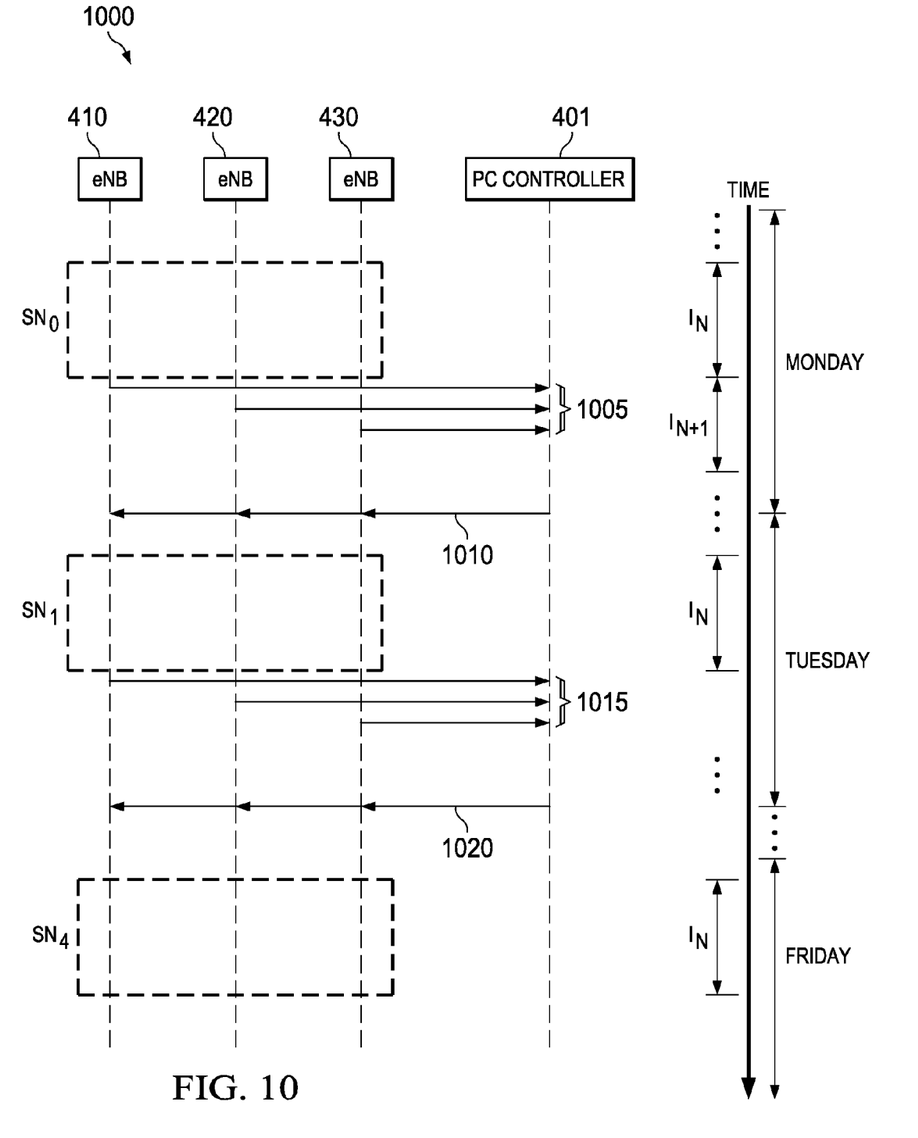
FIG. 10 illustrates a protocol diagram depicting an embodiment communication sequence.

FIG. 10 illustrates a protocol diagram depicting a communication sequence 1000 between the eNBs 410-430 and the PC controller 401 for the purpose of computing a power pattern 652. As shown, the communication sequence 1000 begins with the eNBs 410-430 reporting of long term channel statistics 1005 to the PC controller 401. The long term channel statistics 1005 correspond to channel statistics collected during the scheduling ($SN_0$) occurring over a first instance of a given interval ($I_N$ on Monday), and include more information (e.g., statistically significant information) than the short term channel statistics 705 discussed above. Notably, while days of the week (e.g., Mon, Tue, . . . Fri) are used herein as an exemplary embodiment, aspects of this disclosure may be applied to other cyclical time periods (e.g., school or office operating schedules, months, years) during which repetitive/predictive traffic patterns are observed. After receiving the long-term channel statistics, the PC controller 401 may compute one or more power patterns 1010 (e.g., P*, P**, etc.), which may be communicated to the eNBs 410-430. The power patterns 1010 may be computed by the PC controller 401 off-line, and may be implemented during a second instance of the given interval ($I_N$) on Tuesday. Importantly, the scheduling $SN_1$ (on Tuesday) is performed by the eNBs 410-430 based on the power patterns 1010, hence scheduling may be performed in a dynamically and in distributed/localized fashion. After the interval $I_N$ on Tuesday has expired, the eNBs 410-430 may report long term channel statistics 1115 collected during the interval $I_N$ (on Tuesday) to the PC controller 401. These exchanges may be repeated until Friday. In some embodiments, usage may tend to differ substantially over the weekend, and hence channel statistics collected on Monday-Friday may not be well-suited for predicting traffic patterns and/or user distributions on Saturday and Sunday. In such embodiments, statistics collected on a previous weekend may be used to compute power patterns to be used for semi-static scheduling on Saturday/Sunday.

The communication sequence 1000 may be advantageous over the prior art communication sequence 700 in several respects. For instance, the power patterns 1010, 1020 are based on long-term channel statics 1005, 1015 (respectively), while the power patterns 705, 715 are typically based on short term channel statistics 710, 715. As such, the power patterns 1010, 1020 may provide (on average) better coverage/throughput than power patterns 705, 715, particularly when the lag (e.g., $T_P$ in FIG. 7) prevents the network from reacting swiftly to changes in usage. Further, the power patterns 1005, 1015 are computed offline (e.g., over a longer period of time), and therefore may consume fewer processing resources than computation of the power patterns 705, 715 (which are typically computed dynamically in a quasi-real-time fashion). Without stringent time constraints, the power patterns 1005, 1015 may be computed using a more thorough algorithm (e.g., an exhaustive approach or one has fewer compensations). A further advantage is that less signaling is performed in the communication sequence 1000 than in the prior art communication sequence 700, and therefore fewer network resources are consumed.

Figure 11:
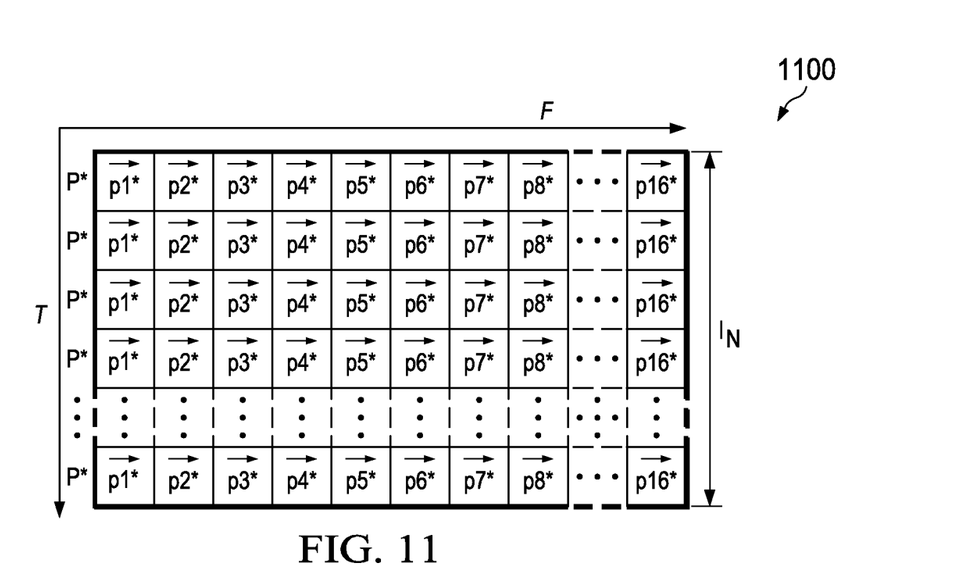
FIG. 11 illustrates an embodiment of semi-static JPC using a single power pattern.
Figure 12:
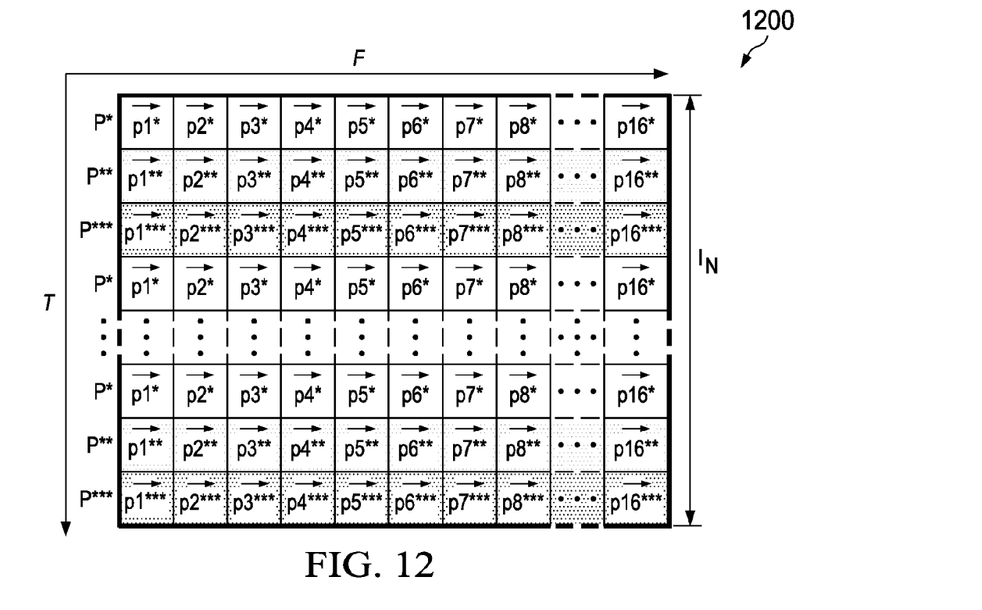
FIG. 12 illustrates an embodiment of semi-static JPC using multiple power patterns.

In some embodiments, the method 800 may generate one power pattern (e.g., P*) that may be used for the entire interval ($I_N$). FIG. 11 illustrates such an embodiment, where the power pattern P* is repeated for each timeslot (T1, T2, . . . TN) of the interval ($I_0$). In other embodiments, the method 800 may generate several power patterns (e.g., P*, P, P*, etc.) that may be used over the entire interval ($I_N$). FIG. 12 illustrates such an embodiment, where a sequence of power patterns (P*, P, and P*) are repeated over a consecutive timeslots (T1, T2, T3, . . . T[N-2], T[N-1], TN) of the interval ($I_0$). Although the sequence of power patterns (P*, P, and P*) are depicted as being repeated sequentially, non-sequential arrangements may be used in some embodiments (e.g., P*, P**, P*, P***, etc.).

The statistical narrowing techniques used to shrink the set of potential patterns into the sub-set of likely power patterns may vary depending on the embodiment, and may include one or more of the following steps. One narrowing step may be to merge redundant and/or correlated power patterns. During merging process, the power levels of two patterns are combined to form a single power pattern. In one embodiment, merging may be achieved by deleting/removing the less probable power pattern without altering the power level of the more probable power pattern. In other embodiments, merging may be achieved by combining the corresponding power levels using their probabilities as weights, e.g., (a1*P1+ a2*P2)/(a1+a2), and a2*P2, where a1 and a2 are the probabilities of each power pattern. Alternative techniques for merging power patterns may also be used. Redundant power patterns may be those patterns having identical power settings (i.e., p1*=p1**; p2*=p2**, etc.). Correlated power patterns may be patterns that have similar power settings (e.g., p1*≈p1; p2≈ p2**; etc.). In embodiments, power patterns that are substantially correlated may be those have a Euclidian distance less than a threshold ($E_{th}$). For instance, a first power pattern (P*) and a second power pattern (P**) may be substantially correlated if their Euclidian distance (E(P*, P**)) is less than the threshold (e.g., E(P*, P**)<$E_{th}$). The Euclidian distance of a given pair of power patterns (P*, P**) may be found according to the following formula:

$$E(P^*, P^{**}) = \sqrt{(p^*_1 - p^{**}_1)^2 + (p^*_2 - p^{**}_2)^2 + \ldots (p^*_m - p^{**}_m)^2}$$

where $p_1$ is a power setting for frequency band ($f_i$) and m is the number of frequency bands in the downlink channel.

Another narrowing step may be to remove improbable power patterns. Probability may be assigned based on the number of times a pattern was merged. For instance, there are 500 potential power patterns in the set of potential power patterns, then each power pattern (initially) has a probabilistic weight of about 0.2%. Hence, merging five redundant/correlated power patterns into a single power pattern will reduce the set of potential power patterns to about 496, as well as allocate a probalistic weight to the merged power pattern of about 1% (e.g., 0.2% multiplied by 5).

Another narrowing step may be to rank the power patterns (e.g., after merging) based on their probability, and (subsequently) merge less probable power patterns. For instance, the more probable power pattern may absorb the less probable power patterns until enough improbable power patterns have been culled. The utilized narrowing technique may include one or more of the above discussed steps.

Figure 13:
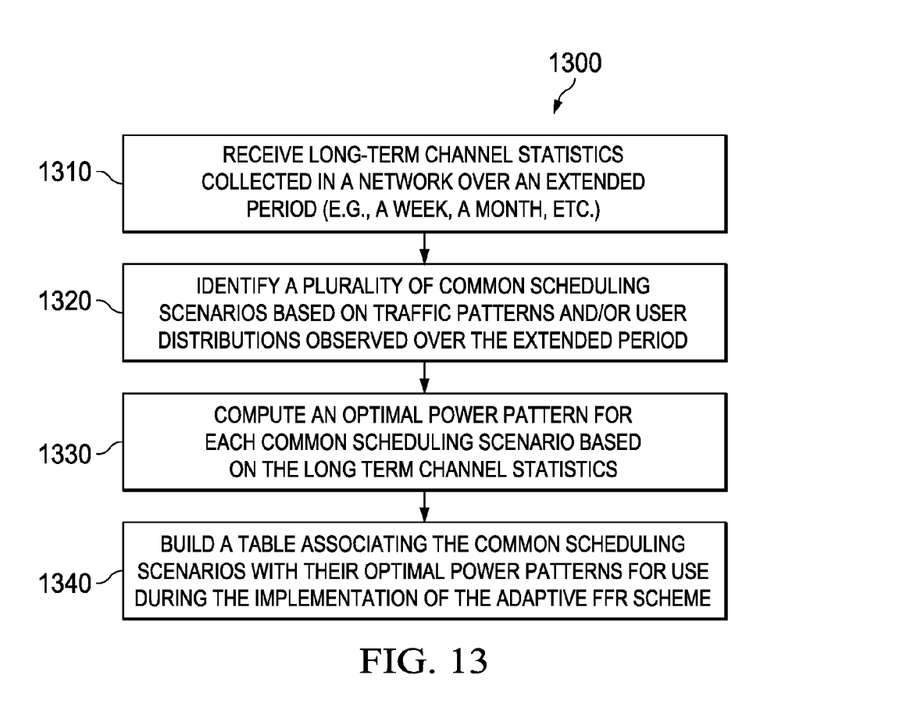
FIG. 13 illustrates a flowchart of an embodiment of a method for generating an adaptive power pattern table.

An adaptive dynamic approach to power pattern computation is an alternative to the semi-static approach (FIG. 8) which may prove advantageous in networks that have the ability to detect traffic patterns, but lack the computational capacity to compute power patterns on a regular basis. FIG. 13 illustrates a method 1300 for generating a table to use during the adaptive approach.

The method 1300 begins at step 1310, where an external processing device may receive long-term channel statistics collected in a network over an extended period of time. The method 1300 may proceed to step 1320, where the external processing device may identify a plurality of common scheduling scenarios based on traffic patterns and/or user distributions observed over the extended period. The method 1300 may then proceed to step 1330, where the external processing device may compute an optimal power pattern for each common scheduling scenario based on the long term channel statistics. The method 1300 may then proceed to step 1340, where the external processing device may build a table associating the optimal power patterns with the common scheduling scenarios. The table may then be provided to a centralized device (e.g., the PC controller 401) or to one or more distributed devices (e.g., the eNBs 410-430) for use during implementations of the adaptive FFR scheme.

In some embodiments, adaptive scheduling and MCS may be performed locally. For instance, the table could be provided to a plurality of distributed eNBs with an instruction to begin adaptive scheduling at a certain time., Hence, each cell could perform scheduling and MCS adaptation locally with the knowledge of their neighbors' power levels and the associated measurements. If the repetitive number of patterns (Nr) is a multiplication of the number of resource units to be scheduled in a given time slot, these interference signal measurements would likely be relatively accurate.

Experimentation and analysis has shown that a relatively low number of scenarios could be used to represent different scheduling scenarios in the system. An additional observation is that when the system has a relatively light load, optimal schemes may not be necessary. As the system experiences new scheduling scenarios (e.g., scheduling scenarios that differ significantly from those existing in the tables), the new scheduling scenarios could be sent to a central device such that a corresponding table entry can be added. Until an updated adaptive scheduling table comprising the new table entry is available the, the closest scheduling scenario in the existing adaptive scheduling table could be used. In some embodiment, the introduction of a new cell would necessitate the creation/preparation of an updated adaptive scheduling table.

Figure 14:
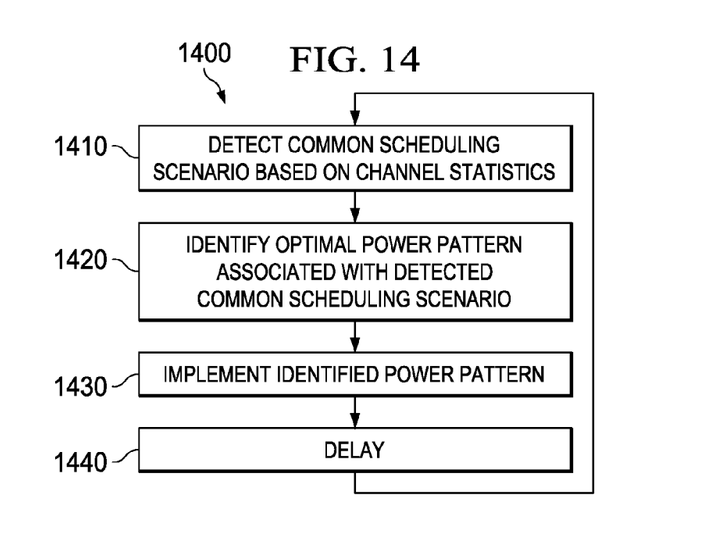
FIG. 14 illustrates a flowchart of an embodiment of a method for performing adaptive PC in a wireless network.

FIG. 14 illustrates a method 1400 for implementing an adaptive FFR scheme (e.g., based on the table provided by the method 1300). The method 1400 may begin at step 1410, where a network device may detect a common scheduling scenario based on channel statistics. Next, the method 1400 may proceed to step 1420, where the network device may identify an optimal power pattern associated with the common scheduling scenario by referencing the adaptive FFR table. Next, the method 1400 may proceed to the step 1430, where the network device may implement the identified power pattern. After a delay 1440, the method 1400 may repeat the steps 1410-1430. In some embodiments, the method 1400 may be performed by a centralized device (e.g., PC controller 401). In other embodiments, the method 1400 may be performed by one or more distributed devices (e.g., eNBs 410-430). In some embodiments, a determination may be made to update the adaptive scheduling table. For instance, such a determination may be made periodically, such as between steps 1440 and 1410 (or other between other steps in the method 1400). This determination may be triggered by the occurrence (or non-occurrence) of some event, such as detection of a new scheduling scenario occurs (e.g., a scheduling scenario that does not have a corresponding entry in the present adaptive scheduling table), the addition (or removal) of a neighboring cell, etc.

Figure 15:
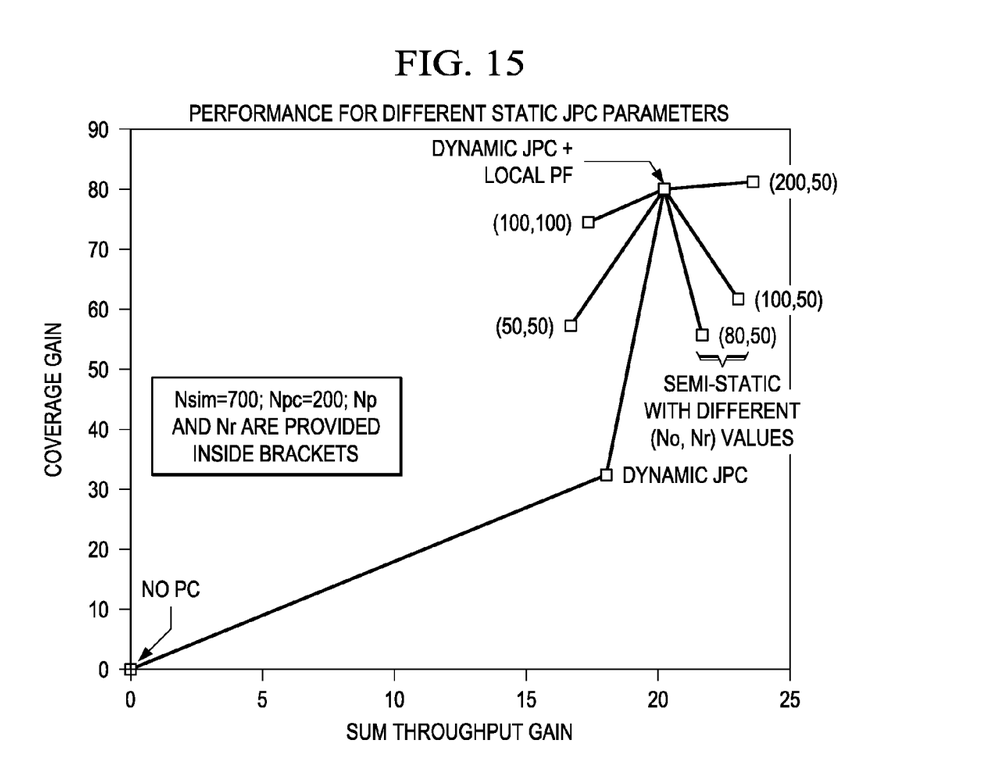
FIG. 15 illustrates a graph depicting variations in performance for different power control schemes.

FIG. 15 illustrates coverage/throughput performance of various power control schemes obtained through simulation. In this example, various simulations were performed for a network comprising 57 cells to illustrate the potential performance advantages that may be achieved through implementation of one or more aspects of this disclosure. In FIG. 15, the reference point labeled no PC identifies results obtained from a simulation performed without any coordinated power control, i.e. all nodes use same transmit power for all the transmissions, the transmit power is set to the maximum transmit power that can be used by a cell. The reference point labeled DYNAMIC JPC identifies results obtained from a simulation performed using a dynamic joint power control and scheduling scheme, which assumes the power and scheduling decisions of all cells are made by the central controller for each time slot and resource unit. It should be noted that, in practice, dynamic joint power control and scheduling (e.g., using an exhaustive search approach) must generally include a number of concessions (e.g., simplifications) which affect the accuracy of the results (e.g., prevent the algorithm from identifying the truly optimal solution). Consequently, dynamic JPC and scheduling schemes (i.e., which include some concessions) often do not perform as well as other PC schemes. Notably, the reference point labeled DYNAMIC JPC represents the best performance that could be obtained from real-world dynamic JPC and scheduling schemes (which, by their very nature, include at least some concessions). The reference point labeled DYNAMIC JPC+LOCAL PF identifies results obtained from a simulation of a system that employed dynamic power control with local scheduling. The reference points labeled (NO, Nr) identify results obtained according to embodiments of the semi-static PC scheme disclosed above. Notably, the simulations were performed under the assumption that the user distributions were the same as those used generate the power patterns. Under this assumption, we can see that the use of repetitive schemes with fewer repetitive patterns provide near optimal performance. For example, the use of N0=200 and a repetitive pattern of 50 offers slightly better performance than that obtained through joint power control and localized scheduling. It should also be noted that having a repetitive pattern of 50 means that 50 frequency blocks for a given time slot are each assigned a power pattern that is maintained throughout the simulation. Since power of the neighbors remain the same during this frequency block for all the time slots, the interference would remain the same and MCS adaptation would be more accurate. Notably, the number of repetitive patterns (Nr) is an integer multiple of the number of resource blocks (Nrb) in a single time slot. As such, the interference received in a given RB repeats in a cyclical manner, thereby making interference measurements and MCS adaptation more accurate.

Figure 16:
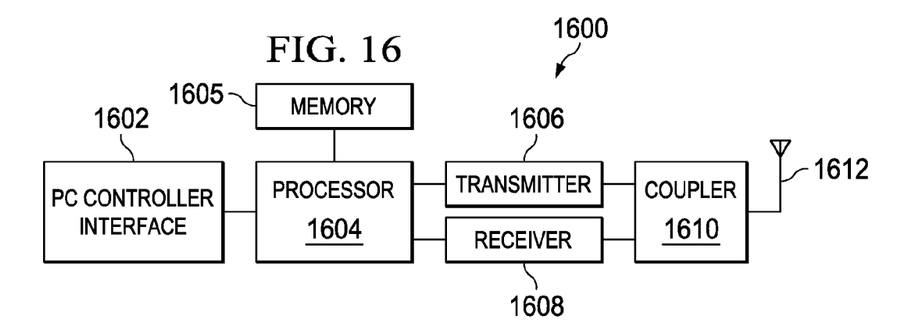
FIG. 16 illustrates a block diagram of an embodiment base station.

FIG. 16 illustrates a block diagram of an eNB 1600. The base station 1600 may include a PC controller interface 1602, a processor 1604, a memory 1605, a transmitter 1606, a receiver 1608, a coupler 1610, and an antenna 1612, which may be arranged as shown in FIG. 16. The PC controller interface 1602 may be any component or collection of components that allows the eNB 1600 to engage in network communications with a PC controller. The processor 1604 may be any component capable of performing computations and/or other processing related tasks, and the memory 1605 may be any component capable of storing programming and/or instructions for the processor. The transmitter 1606 may be any component capable of transmitting a signal, while the receiver 1608 may be any component capable of receiving a signal. The coupler 1610 may be any component capable of isolating a transmission signal from a reception signal, such as a duplexer. The antenna 1612 may be any component capable of emitting and/or receiving a wireless signal. In an embodiment, the eNB 1600 may be configured to operate in an LTE network using an OFDMA downlink channel divided into multiple subbands or subcarriers and using SC-FDMA in the downlink. In alternative embodiments, other systems, network types and transmission schemes can be used, for example, 1XEV-DO, IEEE 802.11, IEEE 802.15 and IEEE 802.16, etc.

Figure 17:
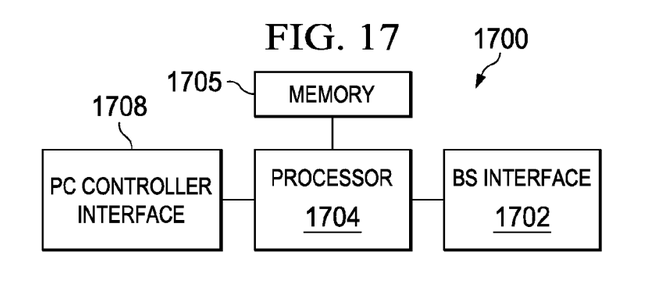
FIG. 17 illustrates a block diagram of an embodiment PC controller.

FIG. 17 illustrates a block diagram of an embodiment PC controller 1700. The PC controller 1700 may include a base station (BS) interface 1702, a processor 1704, a memory 1705, and a PC controller interface 1708, which may be arranged as shown in FIG. 17. The BS interface 1702 may be any component or collection of components that allows the PC controller 1700 to engage in network communications with a BS. The processor 1704 may be any component capable of performing computations and/or other processing related tasks, and the memory 1705 may be any component capable of storing programming and/or instructions for the processor. The PC controller interface 1708 may be any component or collection of components that allows the PC controller 1700 to engage in network communications with other PC controllers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for joint power control (PC) and scheduling in a wireless network, the method comprising:
   receiving, by a controller, channel statistics corresponding to downlink channels associated with a plurality of base stations, wherein the channel statistics are collected during a first instance of a periodic time interval;
   generating a set of possible power patterns in accordance with the channel statistics; and
   selecting one or more power patterns from the set of possible power patterns, wherein the one or more selected power patterns are used to schedule resources for the plurality of base stations during a second instance of the periodic time interval.

2. The method of claim 1, wherein the one or more selected power patterns include at least two power patterns that are implemented in a repetitious manner during a second instance of the periodic time interval.

3. The method of claim 1, wherein the one or more selected power patterns are used by the plurality of base stations to perform local scheduling during the second instance of the periodic time interval.

4. The method of claim 1, further comprising:
   identifying a plurality of scheduling scenarios, wherein the set of possible power patterns provide scheduling solutions for the plurality of scheduling scenarios.

5. The method of claim 4, wherein identifying the plurality of scheduling scenarios comprises identifying scheduling scenarios that are likely to occur during the second instance of the periodic time interval.

6. The method of claim 4, wherein identifying the plurality of scheduling scenarios comprises identifying at least some scheduling scenarios that occurred during the first instance of the periodic time interval.

7. The method of claim 4, wherein identifying the plurality of scheduling scenarios comprises:
   identifying a first set of scheduling scenarios in accordance with the channel statistics;
   modifying the channel statistics by adding fast/temporal fading components to the channel statistics; and
   identifying a second set of scheduling scenarios in accordance with the modified channel statistics, wherein the plurality of scheduling scenarios include both the first set of scheduling scenarios and the second set of scheduling scenarios.

8. A controller in a wireless network, comprising:
   a processor; and
   a non-transitory computer readable storage medium storing programming for execution by the processor, the programming including instructions to:
   receive channel statistics corresponding to downlink channels associated with a plurality of base stations, wherein the channel statistics are collected during a first instance of a periodic time interval;
   generate a set of possible power patterns in accordance with the channel statistics; and
   select one or more power patterns from the set of possible power patterns, wherein the one or more selected power patterns are used to schedule resources for the plurality of base stations during a second instance of the periodic time interval.

9. The controller of claim 8, wherein the one or more selected power patterns include at least two power patterns that are implemented in a repetitious manner during a second instance of the periodic time interval.

10. The controller of claim 8, wherein the one or more selected power patterns are used by the plurality of base stations to perform local scheduling during the second instance of the periodic time interval.

11. The controller of claim 8, wherein the programming further includes instructions to:
identify a plurality of scheduling scenarios, wherein the set of possible power patterns provide scheduling solutions for the plurality of scheduling scenarios.

12. The controller of claim 11, wherein the instructions to identify the plurality of scheduling scenarios include instructions to identify scheduling scenarios that are likely to occur during the second instance of the periodic time interval.

13. The controller of claim 11, wherein the instructions to identify the plurality of scheduling scenarios include instructions to identify at least some scheduling scenarios that occurred during the first instance of the periodic time interval.

14. The controller of claim 11, wherein the instructions to identify the plurality of scheduling scenarios include instructions to:
identify a first set of scheduling scenarios in accordance with the channel statistics;
modify the channel statistics by adding fast/temporal fading components to the channel statistics; and
identify a second set of scheduling scenarios in accordance with the modified channel statistics, wherein the plurality of scheduling scenarios include both the first set of scheduling scenarios and the second set of scheduling scenarios.

15. A method for facilitating dynamic adaptive fractional frequency reuse (FFR) in a wireless network, the method comprising:
receiving channel statistics corresponding to the wireless network;
identifying scheduling scenarios in accordance with the channel statistics;
generating a table of power patterns in accordance with the channel statistics, wherein the table of power patterns comprises a unique power pattern for each of the scheduling scenarios; and
providing the table of power patterns to one or more devices in the wireless network, wherein the table of power patterns is used by the one or more devices to dynamically select power patterns in accordance with detected scheduling scenarios in the wireless network.

16. The method of claim 15, wherein the scheduling scenarios comprise user distributions and traffic patterns that occurred in the wireless network during a previous period.

17. The method of claim 15, wherein the one or more devices include a plurality of base stations, and wherein the table of power patterns is used by each of the plurality of base stations to independently select power patterns in a distributed fashion.

18. The method of claim 15, wherein one or more devices include a centralized controller, and wherein the table of power patterns is used by the centralized controller to globally select power patterns for a plurality of base stations.

19. An apparatus comprising:
a processor; and
a non-transitory computer readable storage medium storing programming for execution by the processor, the programming including instructions to:
receive channel statistics corresponding to a wireless network;
identify scheduling scenarios in accordance with the channel statistics;
generate a table of power patterns in accordance with the channel statistics, wherein the table of power patterns comprises a unique power pattern for each of the scheduling scenarios; and
provide the table of power patterns to one or more devices in the wireless network, wherein the table of power patterns is used by the one or more devices to dynamically select power patterns in accordance with detected scheduling scenarios in the wireless network.

20. The apparatus of claim 19, wherein the scheduling scenarios comprise user distributions and traffic patterns that occurred in the wireless network during a previous period.

21. The apparatus of claim 19, wherein one or more devices include a plurality of base stations, and wherein the table of power patterns is used by each of the plurality of base stations to independently select power patterns in a distributed fashion.

22. The apparatus of claim 19, wherein the one or more devices include a centralized controller, and wherein the table of power patterns is used by the centralized controller to globally select power patterns for a plurality of base stations.

* * * * *